US010309198B2

(12) United States Patent
McElligott et al.

(10) Patent No.: US 10,309,198 B2
(45) Date of Patent: Jun. 4, 2019

(54) PIPE COUPLING

(71) Applicant: Meta Downhole Limited, Aberdeen (GB)

(72) Inventors: William Luke McElligott, Exeter (GB); Neil Philip Thomson, Aberdeen (GB)

(73) Assignee: Morph Packers Limited, Aberdeen (GB)

( * ) Notice: Subject to any disclaimer, the term of this patent is extended or adjusted under 35 U.S.C. 154(b) by 326 days.

(21) Appl. No.: 14/986,689

(22) Filed: Jan. 3, 2016

(65) Prior Publication Data

US 2016/0195203 A1 Jul. 7, 2016

(30) Foreign Application Priority Data

Jan. 5, 2015 (GB) .................................. 1500079.7

(51) Int. Cl.
*E21B 43/10* (2006.01)
*E21B 17/043* (2006.01)
(Continued)

(52) U.S. Cl.
CPC .......... *E21B 43/106* (2013.01); *E21B 17/042* (2013.01); *E21B 17/043* (2013.01);
(Continued)

(58) Field of Classification Search
CPC ......... F16L 15/00; F16L 15/04; F16L 15/002; F16L 15/06; Y10T 29/49881; E21B 43/106; E21B 17/046; E21B 17/043
(Continued)

(56) References Cited

U.S. PATENT DOCUMENTS 3,989,284 A   11/1976 Blose
4,298,221 A * 11/1981 McGugan ............. E21B 17/046
                                                285/332.4 X
(Continued)

FOREIGN PATENT DOCUMENTS

GB         2153027 A      8/1985
WO       WO 00/65268     11/2000
WO     WO 2011/005669 A1  1/2011

OTHER PUBLICATIONS

European Patent Office as Int'l Search Authority; International Search Report for PCT/GB2016/050002; dated Apr. 8, 2016; pp. 1-5; European Patent Office, Rijswijk, NL.
(Continued)

*Primary Examiner* — Greg Binda
*Assistant Examiner* — Zachary T Dragicevich
(74) *Attorney, Agent, or Firm* — Law Office of Jesse D. Lambert, LLC

(57) ABSTRACT

A coupling system between tubular members such as tubing, pipes, casing and liner for location in a well bore in which the ends of each tubular have cooperating profiled sections. The profiled sections are arranged coaxially and a radially applied force is applied to form a metal to metal sealed connection. At least one profiled section includes a projection, the projection containing an overhang to the surface of the tubular member, the overhang locking with the opposing profile when the force is applied to provide a coupling with increased burst and collapse rating. Embodiments are provided of arrangements of overhangs such as oppositely directed overhangs and interlocking overhangs.

20 Claims, 4 Drawing Sheets

(51) Int. Cl.
*F16L 15/06* (2006.01)
*F16L 15/00* (2006.01)
*F16L 15/04* (2006.01)
*E21B 17/042* (2006.01)

(52) U.S. Cl.
CPC .............. *F16L 15/002* (2013.01); *F16L 15/04* (2013.01); *F16L 15/06* (2013.01); *Y10T 29/49881* (2015.01)

(58) Field of Classification Search
USPC .......... 285/332, 332.1, 332.4, 333, 334, 390
See application file for complete search history.

(56) References Cited

U.S. PATENT DOCUMENTS

| | | | |
|---|---|---|---|
| 4,525,001 A | | 6/1985 | Lumsden et al. |
| 4,561,683 A | * | 12/1985 | Lumsden .............. E21B 17/046 |
| 4,600,224 A | | 7/1986 | Blose |
| 4,707,001 A | | 11/1987 | Johnson |
| 4,779,902 A | * | 10/1988 | Lee |
| 4,822,081 A | | 4/1989 | Blose |
| 6,231,086 B1 | * | 5/2001 | Tierling |
| 6,254,146 B1 | | 7/2001 | Church |
| 6,543,816 B1 | * | 4/2003 | Noel ...................... F16L 15/00 285/332.4 |
| 2002/0130517 A1 | | 9/2002 | DeLange et al. |
| 2003/0168858 A1 | | 9/2003 | Hashem |
| 2004/0069498 A1 | * | 4/2004 | Simpson ............... E21B 43/106 |
| 2005/0093250 A1 | | 5/2005 | Santi et al. |
| 2010/0171306 A1 | * | 7/2010 | Gillot .................... F16L 15/002 285/334 |
| 2012/0235404 A1 | * | 9/2012 | Coeffe .................. E21B 17/043 285/332 |
| 2012/0286507 A1 | | 11/2012 | Maillon et al. |
| 2014/0203556 A1 | * | 7/2014 | Besse ...................... F16L 15/06 285/390 |

OTHER PUBLICATIONS

United Kingdom Intellectual Property Office; Search report for GB1600087.9; dated Jul. 5, 2016; pp. 1-2; UK Intellectual Property Office, UK.

* cited by examiner

PIPE COUPLING

The present invention relates to a coupling system between tubulars such as tubing, pipes, casing and liner for location in a well bore. In particular, though not exclusively, the invention relates to an improved coupling system in which an overhang is profiled on a surface of at least one of the tubulars and by using a radially applied force to form a metal to metal sealed connection, axial load bearing capacity is provided giving a connection with an increased collapse and burst rating.

In the exploration and production of oil and gas wells, tubulars in the form of tubing, pipe, casing and liner are run into the well bore. As the depth of each well bore can be hundreds of meters, the tubulars are manufactured in fixed lengths and then they require to be joined together. A typical method of joining tubulars together is to use a screw threaded connection to form a tubular string for insertion in a well bore. In order to achieve this type of connection each tubular member is manufactured with a box section at a first end and a pin section at the opposing end having respective male and female screw threads. The outer surface at the ends of the tubulars are keyed to allow one tubular to be held in place while the second tubular is turned so as to mate with the first and make-up the threaded connection. A known disadvantage of such a connection is that if the tubular string becomes stuck in the well bore, the string cannot be rotated counter to the direction of the screw thread as the connection may come apart. Standard screw threaded connections may also not provide a reliable seal between the inside of the tubulars and the outside of the tubulars at the connection as a fluid path can exist along the helical screw thread. Additionally the threads can be prone to make up problems, require the use of dope (lubricant and sealant) and can have a complex supply chain.

To overcome these disadvantages, the present applicants have proposed a pipe coupling described in GB2503344 as a coupling system between tubulars such as tubing, pipes, casing and liner for location in a well bore in which profiled sections on the tubulars are connected using a radially applied force to form a metal to metal sealed connection. Embodiments are provided in which the profiled sections are grooved and/or tapered, additional profiles are provided to prevent relative rotation of the tubulars, the radial force is applied inwardly, outwardly or in both directions, and a connector is used as an additional tubular member to form the coupling. GB2395501 describes a similar arrangement of mating profiles where a mating shoulder is first used to contact the two tubulars and then a cone is driven through the tubulars to plastically deform one or both tubulars and thereby create a seal between mating profiles on each tubular.

In these prior art arrangements, a sawtooth profile is typically formed along and extending circumferentially and continuously around an outer surface of a first tubular. Each tooth of the profile is identical, directed radially outwards, perpendicularly or at a fixed angle to the outer surface, providing a rim with grooves therebetween. A mating profile is provided on the inner surface of a second tubular, with each rim designed to mate in an opposing groove when the tubulars are brought together by a radial force. While such arrangements provide a good metal to metal seal, the matched profiles are subject to similar collapse and burst ratings as the screw threaded connections, in use, as force applied inwardly or outwardly will act on each coupling in an identical manner, forcing the profiles apart.

It is therefore an object of at least one embodiment of the present invention to provide a coupling system between tubulars which mitigates at least some of the disadvantages of the prior art.

According to a first aspect of the present invention there is provided a coupling system between first and second tubular members comprising: a first tubular member having a first end which includes a first profiled section extending circumferentially and continuously around an outer surface; a second tubular member having a second end which includes a second profiled section extending circumferentially and continuously around an inner surface; the first end of the first tubular member being inserted within the second end of the second tubular member so that the profiled sections are coaxial and by application of a force creating a metal to metal seal between the tubular members at the profiled sections characterised in that at least one profiled section includes a projection, the projection containing an overhang to the surface of the tubular member.

In this way, the overhang provides a catch or pick-up point on a tubular member. When the force is applied the overhang creates an interlocking feature in the seal which provides axial load bearing capacity to the coupling.

Preferably, the at least one profiled section includes two overhangs, the overhangs being oppositely directed. In this way, the coupling has axial load bearing capacity in both directions. The overhangs may be on opposite sides of a single projection or may be on independent projections.

Alternatively, a first overhang is on the first profiled section and a second overhang is on the second profiled section, the first and second overhangs being oppositely directed. The first and second overhangs may be arranged coaxially in the coupling. In this way, the overhangs will interlock and fasten the two tubular members together like a zip if the force is applied by drawing a cone through the tubular members or by drawing a swage up the outer surface of the tubular members.

Alternatively, the first and second overhangs are separated longitudinally. In this arrangement, a mating profile at each overhang may be a projection having an outer face which is perpendicular to the surface of the tubular member. In this way, axial load bearing capacity is directed outwardly from a midpoint between the overhangs.

Preferably, there are a plurality of first overhangs and a plurality of second overhangs. This increases the load bearing capacity in each direction. In an embodiment, there are a plurality of first overhangs on an upper portion of the first profiled section and a plurality of second overhangs on a lower portion of the first profiled section, the first and second overhangs being oppositely directed. Correspondingly, there may be a plurality of second overhangs on an upper portion of the second profiled section and a plurality of first overhangs on a lower portion of the second profiled section. This provides distributed axial load bearing capacity.

Advantageously, each projection provides a guide surface opposite the overhang. In this way, guide surfaces on each profiled section will push the opposing overhangs under each other when the force is applied. In this way, the zip action of interweaving the profiles to make the seal is improved.

Preferably the first and second tubular members have the same outer diameter and inner diameter. In this way, a coupling can be made-up without requiring box sections at the coupling point.

Preferably the force is applied radially outwardly. In this way, a force is applied to an inner surface of the first tubular member to cause it to expand and contact the inner surface of the second tubular. More preferably, the force is applied radially inwards. In this way, the force is applied to an outer surface of the second tubular to cause it to move radially inwards and contact the inner surface of the first tubular. In this way, an interference is created between the first and second profiled sections on each tubular member.

By applying a radial force to make-up the coupling, the tubular members do not have to be turned as would be required for a screw-thread.

Preferably, the projection is a continuous annular rim. In this way, a plurality of spaced apart projections form one or more circumferential grooves on the outer surface of the first end of the first tubular member and one or more circumferential grooves on the inner surface of the first end of the second tubular member.

Preferably, a width of each projection in the axial direction, decreases towards the first end of the first tubular member. Preferably also, a width of each projection in the axial direction, decreases towards the second end of the second tubular member.

Preferably, the first profiled section is tapered. In this way, the thickness of the tubular wall reduces across the first end being narrowest at a distal end. Preferably also, the second profiled section is tapered. In this way, the thickness of the tubular wall reduces across the second end being narrowest at a distal end. Tapering the ends reduces the required outer diameter of the coupling while maintaining the diameter of the inner through bore.

In an embodiment, the first tubular member having:
a cylindrical body with an inner body diameter and an outer body diameter substantially along its length;
the first end with a first end inner diameter and a first end outer diameter, the first end including the first profiled section extending circumferentially and continuously around an outer surface;
the second tubular member having:
a cylindrical body with the inner body diameter and the outer body diameter substantially along its length;
the second end with a second end inner diameter and a second end outer diameter, the second end including a second profiled section extending circumferentially and continuously around an inner surface; wherein:
the first and second end inner diameters are greater than the inner body diameter;
the first and second end outer diameters are greater than the outer body diameter;
and the first end of the first tubular member being inserted within the second end of the second tubular member so that the profiled sections are coaxial and by application of a radially inward force creating a connection having a metal to metal seal between the tubular members at the profiled sections with the connection having substantially the inner body diameter and the outer body diameter.

In this way, the tubular members can be coupled directly together by an interference fit creating a connection which has the same inner and outer diameter as the tubular members, providing a substantially continuous tubular.

Preferably the first tubular member has the second end opposite the first end. Preferably also, the second tubular member has the first end opposite the second end. In this way, the first and second tubular members may be identical. This provides a coupling system suitable for use in providing tubular strings as are known in the oil and gas industry.

Preferably the inner and outer body diameters are selected to match standard diameters of tubulars used in downhole oil and gas exploration and production. In this way, a tubular string can be made-up without requiring box sections at the coupling points.

Preferably the force is applied radially inwards over the ends of the tubulars. More preferably, the force is applied by a swaged die being driven over the outer surface of the second tubular towards the first tubular. In this way, the force is applied to an outer surface of the second tubular to cause it to move radially inwards and contact the inner surface of the first tubular, both ends are elastically deformed and morphed to have the outer body diameter. In this way, an interference is created between the first and second profiled sections on each tubular member.

Preferably, the first profiled section is tapered. In this way, the thickness of the tubular wall reduces across the first end being narrowest at a distal end. Preferably also, the second profiled section is tapered. In this way, the thickness of the tubular wall reduces across the first end being narrowest at a distal end. Tapering the ends provides a combined wall thickness which, when morphed, has the inner body diameter and the outer body diameter.

Preferably, a wall thickness of the first end is substantially the same as the wall thickness of the second end. Preferably also, the wall thickness of the first and second ends is substantially the same as the wall thickness of the body of the first and second members. In this way, wall thickness across the connection is maintained.

According to a second aspect of the present invention there is provided a method of coupling tubular members at a well, comprising the steps:
(a) providing a coupling system according to the first aspect;
(b) gripping the second tubular member in a tubular string at the well;
(c) supporting the first tubular member and moving the first tubular member to the second tubular member;
(d) locating the first end of the first tubular member into the second end of the second tubular member;
(e) applying a force to move the first and second ends relative to each other under elastic and plastic deformation; and
(f) creating a metal to metal seal between the first end of the first tubular member and the second end of the second tubular member.

In this way, a pipe coupling is formed at a well without requiring rotation of either tubular section or monitoring of weights, thread counts and applied torque.

Preferably, the method includes the steps of:
(g) applying fluid pressure to the outside of the coupling system;
(h) lifting a distal end of the second end of the second tubular member away from the outer surface of the first tubular member; and
(i) thereby increasing the seal between the tubular members at the projection.

In this way, the projection halts lifting of the second tubular member and the fluid pressure increases the seal. Thus the collapse rating of the coupling system is improved.

Preferably, the method includes the steps of:
(j) applying fluid pressure to the inside of the coupling system;
(k) lifting a distal end of the first end of the first tubular member away from the inner surface of the second tubular member; and
(l) thereby increasing the seal between the tubular members at the projection.

In this way, the projection halts lifting of the first tubular member and the fluid pressure increases the seal. Thus the burst rating of the coupling system improved.

In an embodiment, in step (e) the force is applied by fluid pressure within the tubular members so as to morph the tubular members together.

Alternatively, in step (e) the force is applied by drawing an expansion tool through the tubular members. Such an expansion tool may be a cone which forces the first tubular member radially outwards to create the seal.

Preferably, in step (e) the force is applied by a swaged die. The method may then include the steps of:
(a) arranging a swaged die around the second tubular member;
(b) forcing the swaged die along the second tubular member towards the first tubular member.

Further features are embodied in the description.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that the different teachings of the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All numerical values in this disclosure are understood as being modified by "about". All singular forms of elements, or any other components described herein including (without limitations) components of the apparatus are understood to include plural forms thereof.

Embodiments of the present invention will now be described, by way of example only, with reference to the accompanying drawings of which:

Figure 1:
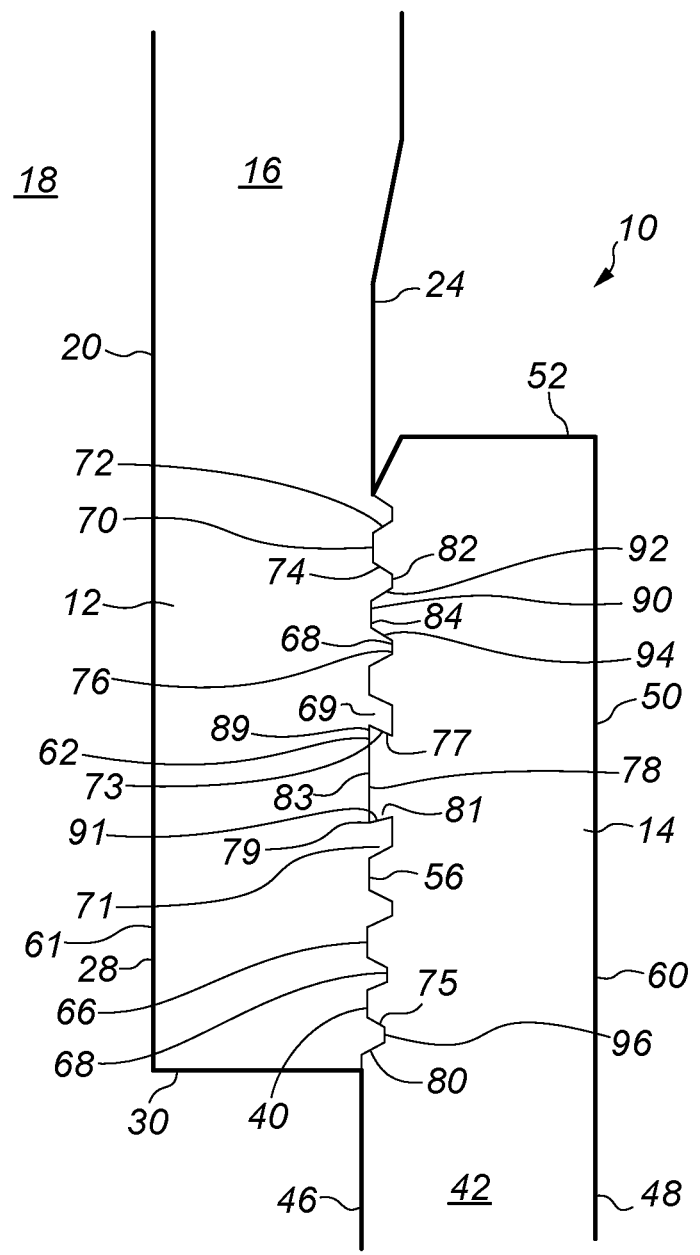
FIG. 1 is a half cross-sectional view of a coupling system according to an embodiment of the present invention.

Referring initially to FIG. 1 of the drawings there is provided a coupling system, generally indicated by reference numeral 10, providing a connection between a first tubular member 12 and a second tubular member 14 according to an embodiment of the present invention.

The first tubular member 12 has a substantially cylindrical body 16 having a bore 18 therethough providing an inner surface 20 and an outer surface 24. The body 16 of first tubular member 12 is of metal construction and has dimensions typical of tubulars found in the oil and gas industry as used in tubing strings, casings and liners. The first tubular member 12 has a first end 28 with an annular end face 30 which is substantially perpendicular to the longitudinal axis of the bore 18.

The second tubular member 14 has a substantially cylindrical body 42 having a common bore 18 therethough providing an inner surface 46 and an outer surface 48. The body 42 of the second tubular member 14 is also of metal construction and has dimensions typical of tubulars found in the oil and gas industry as used in tubing strings, casings and liners. The second tubular member 14 has a second end 50 with an annular end face 52 which is substantially perpendicular to the longitudinal axis of the bore 18.

On the outer surface 40 of the first end 28 of the first tubular member 12 there is a first profiled section 62. Profiled section 62 is a shape machined into the outer surface 40. The shape is entirely circumferential in that a cross-sectional view, as shown in FIG. 1, would be identical for every cross-section around the tubular 12.

A majority of the profiled section 62 of the first tubular member 12 is provided with grooves 66 having rims 68 there between. The grooves 66 and rims 68 are arranged axially along the outer surface 40. The arrangement of parallel grooves 66, being perpendicular to the bore 18 and providing a continuous circumferential profile on the outer surface 40, can be clearly seen. This is in direct contrast to a screw thread arrangement which would provide a single groove helically wound on the outer surface. Note that the depths of the grooves 66 and the respective heights of the rims 68 are small in relation to the thickness of the wall of the first tubular member 12. This is done to provide maximum strength at the end 28. The grooves 66 and rims 68 provide a sawtooth arrangement. On the outer surface 40 there are arranged a parallel series of grooves 66. Each groove 66 has a base 70 with sloping side walls 72, 74. Each sloping wall 72, 74 provides an outer face 75 makes an obtuse angle with the base which is between 90 and 180 degrees. Between each groove 66 there is provided a rim 68. The side walls 72, 74 match those of the grooves bounding the rim 68. The rim 68 is trapezoidal in shape so that its top 76 is substantially parallel to the bore 18. It will be appreciated that the grooves/rims can be of any complementary shape, for example trapezoidal or triangular. Equally the sides need not be straight, they may be curved or have any profile which increases the potential surface area or number of points of contact to make a seal.

On the inner surface 56 of the second end 50 of the second tubular member 14 there is a second profiled section 80. Profiled section 80 is a shape machined into the inner surface 56. The shape is entirely circumferential in that, a cross-sectional view as shown in FIG. 1, would be identical for every cross-section around the tubular 14. A majority of the profiled section 80 of the second tubular member 14 is also provided with grooves 82 having rims 84 there between. However the grooves 82 and rims 84 are the inverse of the grooves 66 and rims 68. In this way, the rims 68, 84 lie within the opposing grooves 82, 66, respectively when the first 28 and second 50 ends are arranged coaxially together as per FIG. 1. Corollary to profiled section 62, each rim 84 has a top 90 with sloping side walls 92, 94. The side walls 92, 94 match those of the grooves bounding the rim 68. The groove 82 is trapezoidal in shape so that its base 96 is substantially parallel to the bore 18. Each sloping wall 92, 94 provides an outer face 95 makes an obtuse angle with the base 96 which is between 90 and 180 degrees. The rims 68, 84 and grooves 66, 82 are as would be found on the prior art coupling system described in GB2503344, herein incorporated by reference.

Of note, however, is the alternative rim and groove arrangement at the central portion of the profiled sections 62, 80. On the profiled section 62, there is a base 70, bounded by two rims 69, 71. Each rim 69, 71 forms a projection from the outer surface 40 as for the other rims 68. The upper rim 69 has a sloping wall 74 which falls into neighboring groove 66. However, the opposing sloping wall 73 is not obtuse to the base 70, but now forms an acute angle with the base 70. The result is a projection, rim 69, with an overhang 77 to the outer surface 40. Rim 71 similarly has a standard sloping wall 72, facing the end face 30, with an opposing sloping wall 79 which is at an acute angle (between zero and ninety degrees) to the base 70 between the rims 69, 71. This forms an overhang 81 to the outer surface 40. The overhangs 77, 81 are oppositely directed.

On the opposite profile 80, there is a rim 83 shown with both sloping side walls 85, 87 being acute to the bases 96 of the neighboring grooves 82. Thus the profiled section 80 also provides a projection, in the form of rim 83, having an overhang 89, 91 at either side which is acute to the inner surface 56. The overhangs 89, 91 are again, oppositely directed.

While the overhangs 89, 91 are shown at acute angles to the bases 96, it will be apparent that to bring the two surfaces radially together, these angles must be closer to 90 degrees. Thus the sloping walls 85, 87 need not match the angle of the sloping walls 73, 74 of the bounding rims 69, 71 on construction.

In use, the first end 28 of the first tubular member 12 is inserted into the second end 50 of the second tubular member 14 until the profiled sections 62, 80 are coaxially arranged and the bores 18 overlap axially. A metal to metal seal is created between the profiled sections 62, 80 at the first end 28 of the first tubular member 12 and the second end 50 of the second tubular member 14. This is achieved by applying force to the inner surface 61 at the first end 28 of the first tubular member 12 or by applying force to the outer surface 60 at the second end 50 of the second tubular member 14. The force is applied radially, that is perpendicular to the axial bore 18. There are a number of options for applying the radial force.

Fluid pressure may be applied against the inner surface 61 of the first tubular. The fluid may be applied by creating a seal in the bore near the face 30 and pumping fluid from the surface. Alternatively a seal may be created by use of a hydraulic tool (not shown). A detailed description of the operation of such a hydraulic tool is described in GB2398312 in relation to the packer tool 112 shown in FIG. 27 with suitable modifications thereto, where the seal means 92 could be provided by suitably modified seal assemblies 214, 215 of GB2398312, the disclosure of which is incorporated herein by reference. The entire disclosure of GB2398312 is incorporated herein by reference.

The tool is inserted into the tubulars 12, 14 and located within the bore 18 of the first tubular member 12. Elastomeric seals are arranged on the tool to straddle the profiled section 62 and lie over the inner surface 61 of the tubular member 12. When in position the elastomeric seals are energised so that they expand radially outwardly and create a seal between the outer surface of the tool body and the inner surface 61 of the first tubular member 12. With the seals energised a chamber is created which is bounded by the outer surface of the tool, the inner surface 61 and the elastomeric seals. Hydraulic fluid is then pumped through the tool body so that it exits a port and enters the chamber. Once the chamber is filled, continued pumping forces the end 28 of the tubular member 12 to move radially outwardly by the use of fluid pressure acting directly on the inner surface 61 between the elastomeric seals. Sufficient hydraulic fluid pressure is applied to move the end 28 of the tubular member 12 radially outwards and cause the tubular member 12 to morph itself onto the inner surface 56 of the second end 50 of the second tubular member 14. During the morphing process, the tubular member 12 will undergo elastic expansion filling or at least partially filling the grooves 52. Continued expansion will cause the tubular member 12 to undergo plastic deformation. Sufficient pressure may be applied to cause the second end 50 of the second tubular member 14 to undergo elastic deformation to expand by a small percentage as contact is made. Pumping of hydraulic fluid is then stopped. As the pressure is released the end 50 of the second tubular member 14 returns to its original dimensions and creates a seal against the deformed end 28 of the tubular member 12.

During the morphing process, the inner 61 surface of the end 28 of the first tubular member 12 will take up the shape of the inner surface 56 of the second end 50 of the second tubular member 14. A metal to metal seal is preferentially achieved between the first tubular member 12 and the second tubular member 14 at the side walls 72, 74 of the grooves 66 as the tubular member 12 bends around when it is morphed into the grooves 82. The grooves 62, 82 provide for vertical loading when the tubular members 12, 14 are arranged for insertion in the well bore.

Additionally, the rim 83 will be forced into the groove 78 between the overhangs 77, 81. As morphing occurs, the overhangs 89, 91 of the rim 83 are forced under the opposing overhangs 77, 81 providing a claw, hook or gripper effect between the profiles 62, 80. This increases both the radial and vertical loading capability at the coupling 10 when the seal is made.

With a joint between the first tubular member 12 and the second tubular member 14 made, the elastomeric seals on the tool are de-energised so that they come away from the surface 61. The tool can then be removed from the tubular members 12, 14.

An alternative method of achieving the seal is by drawing a cone through the bore 18 of the tubulars 12, 14. The cone has an outer diameter greater than the inner diameter of surface 61. As the cone is pulled or pushed through the bore, it will radially displace the first tubular member 12 thus achieving the same morph as described hereinbefore for the hydraulic tool.

A yet further alternative method of achieving the seal is by creating an inward radial force on the outer surface 48 of the second tubular member 14. A swage die is fitted around the outer surface 48 of the second tubular member 14 on the body 42. The tubulars 12, 14 are then moved relative to the swage die to cause the die to move over the outer surface 60 of the second end 50. As the inner diameter of the swage die is smaller than the outer diameter of the second end 50, the second end 50 will be elastically deformed and move radially inwards so that a seal is created in an identical manner to that described hereinbefore for the hydraulic tool.

Although a pair of opposing overhangs is provided on each of the tubular members 12, 14, it will be appreciated that a single overhang on one tubular can still provide increased load capacity. Increased radial load capacity can be achieved with a single overhang on each tubular, the overhangs being oppositely directed i.e. one upward facing and one downward facing. The paired arrangement of oppositely directed overhangs shown in FIG. 1, provides vertical load bearing in both upward and downward directions.

Figure 2:
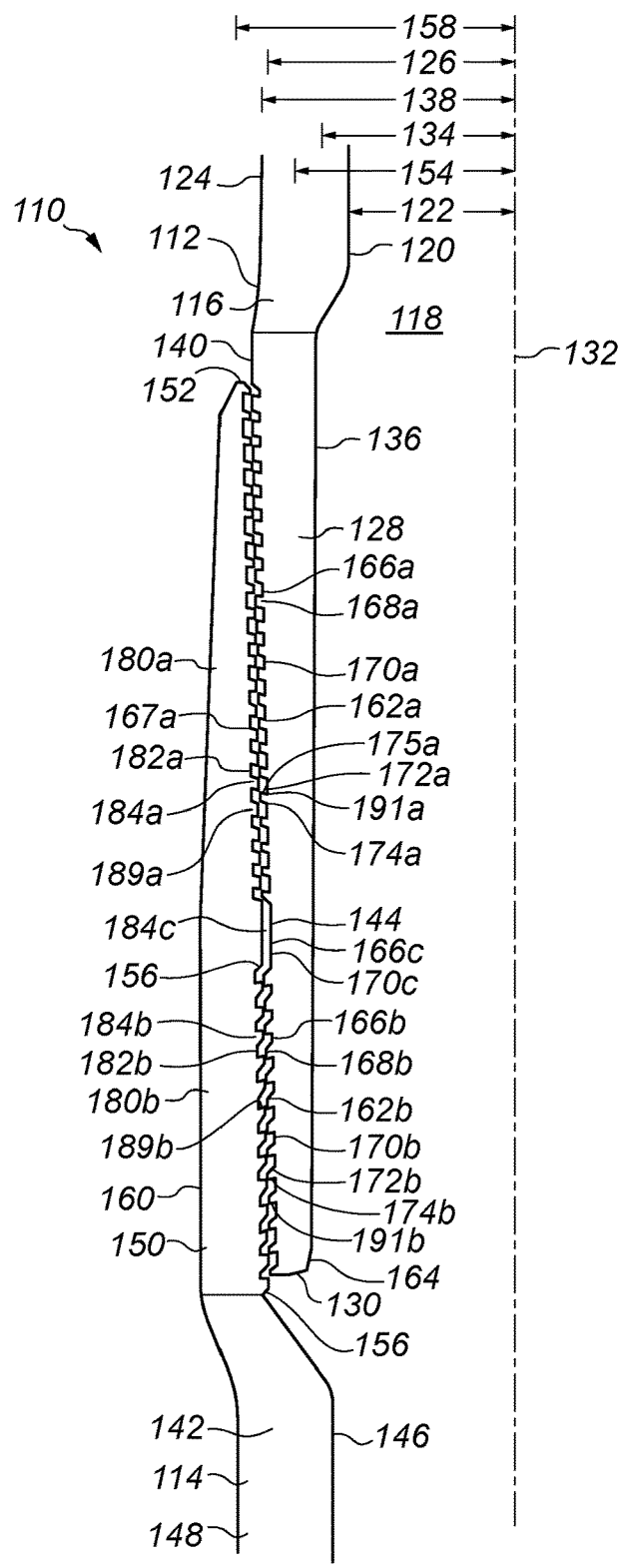
FIG. 2 is a half cross-sectional view of a coupling system according to a second embodiment of the present invention.

Reference is now made to FIG. 2 of the drawings there is provided a coupling system, generally indicated by reference numeral 110, providing a connection between a first tubular member 112 and a second tubular member 114 according to a further embodiment of the present invention.

Corresponding parts to those of FIG. 1 have been given the same reference numeral with the addition of '100' to aid clarity.

The first tubular member 112 has a substantially cylindrical body 116 having a bore 118 therethough providing an inner surface 120 with a first diameter 122 and an outer surface 124 with a second diameter 126 along a majority of it's length. Note that the Figure marks the diameters to the longitudinal axis 132 of the bore 118, the distance representing the radius. The body 116 of first tubular member 112 is of metal construction and has dimensions typical of tubulars found in the oil and gas industry as used in tubing strings, casings and liners. The first tubular member 112 has a first end 128 with an annular end face 130 which is substantially perpendicular to the longitudinal axis of the bore 118.

The first end 128 is radially expanded from the body 116 providing an increased inner diameter 134 to the inner surface 136 of the first end 128 and an increased outer diameter 138 to the outer surface 140 of the first end 128. Preferably the wall thickness at the first end 128 is the same or substantially similar to the wall thickness of the body 116.

The second tubular member 114 has a substantially cylindrical body 142 having a bore 118 therethough providing an inner surface 146 with the first diameter 122 and an outer surface 148 with the second diameter 126 along a majority of it's length. Thus the body 116 of the first tubular member 112 and the body 142 of the second tubular member 114 have the same dimensions. The body 142 of the second tubular member 114 is also of metal construction and has dimensions typical of tubulars found in the oil and gas industry as used in tubing strings, casings and liners. The second tubular member 114 has a second end 150 with an annular end face 152 which is substantially perpendicular to the longitudinal axis 132 of the bore 118. It is noted that the tubular members 112, 114 are collinear on the longitudinal axis 132.

The second end 150 is also radially expanded from the body 142 providing an increased inner diameter 154 to the inner surface 156 of the second end 150 and an increased outer diameter 158 to the outer surface 160 of the second end 150. Preferably the wall thickness at the second end 150 is the same or substantially similar to the wall thickness of the body 142.

On the outer surface 140 of the first end 28 of the first tubular member 112 there is a first profiled section 162. Profiled section 162 is a shape machined into the outer surface 40. The shape is entirely circumferential in that, a cross-sectional view as shown in FIG. 2, would be identical for every cross-section around the tubular 112. Profiled section 162 is tapered. In this way the outer surface 140 reduces from the outer diameter 138 towards the inner diameter 122, leaving a wall thickness of the annular end face 130 at the distal end 164. The taper is gradual and thus easily machined on the end 128 of the tubular 112. While this embodiment shows a taper it will be appreciated that a taper is not essential, but merely preferred.

The first profiled section 162 of the first tubular member 112 has an upper section 162a and a lower section 162b. The upper section 162a is provided with grooves 166a having rims 168a there between. The grooves 166a and rims 168a are arranged along the tapered edge. Note that the depths of the grooves 166a and the respective heights of the rims 168a are small in relation to the thickness of the wall of the first tubular member 112. This is done to provide maximum strength at the end 128.

The grooves 166a and rims 168a provide a toothed arrangement in cross-section. On the tapered outer surface 140 there are arranged a parallel series of grooves 166a. Each groove 166a has a tapered base 170a. Each rim 168a is formed as a projection from the outer surface 140 and has sloping side walls 172a, 174a. The side wall 174a closer to the end face 130 is sloped at an obtuse angle with respect to the base 170a and the outer surface 140. The opposing side wall 172a of the rim 168a is at an acute angle with respect to the base 170a and the outer surface 140. The acute angle provides an outer face 175a to the rim 168a which faces the base 170a. The outer face 175a of the rim 168a creates an overhang 191a with respect to the outer surface 140 which can be considered to be upwardly directed.

The lower section 162b is also provided with grooves 166b having rims 168b there between. The grooves 166b and rims 168b are arranged along the tapered edge. The depths of the grooves 166a,b and the respective heights of the rims 168a,b increase along the taper towards the distal end 164. Additionally, the length of the base 170a,b of each groove 166a,b and the width of the rim 168a,b increases along the taper towards the distal end 164.

On the lower section 162b, the rims 168b and their overhangs 191b are downwardly directed as opposed to those of the upper section 162b. In this way, the side wall 174b closest to the end face 130 is now at the acute angle to the base 170b and the outer surface 140. This side wall 174b has an outer face 175b which now provides the overhang 191b. Thus, like the embodiment of FIG. 1, the profiled section 162 has oppositely directed overhangs 162a,b. However, in the second embodiment similarly directed overhangs 191a, 191b respectively are arranged in series along the outer surface 140 spreading from a central section 144.

On the inner surface 156 of the second end 150 of the second tubular member 114 there is a second profiled section 180. The second profiled section 180 is complimentary to the first profiled section 162 and thus provides upper 180a and lower 180b profiled sections. The profiled section 180 is a shape machined into the inner surface 156. The shape is entirely circumferential in that, a cross-sectional view as shown in FIG. 2, would be identical for every cross-section around the tubular 114.

Like the profiled section 162 of the first tubular member 112, the profiled section 180 of the second tubular member 114 is also provided with grooves 182 having rims 184 there between. However the grooves 182 and rims 184 are the inverse of the grooves 166 and rims 168. In this way, the rims 168, 184 can lie within the opposing grooves 182, 166, respectively when the first 128 and second 150 ends are arranged coaxially together as per FIG. 2. Thus in the upper profiled section 180a, the rims 184a provide a overhang 189a which is now downwardly directed i.e. opposite in direction to the overhang 191a of the upper profiled section 162a to which it is coaxially arranged with. Similarly, rims 184b on the lower profiled section 180b provide upwardly directed overhangs 189a with respect to the outer surface 156.

At the central portion 144, the first profiled section 162 provides a groove 166c having side walls which are obtuse to the base 170c of the groove 166c. The second profiled section provides a rim 184c also having side walls which are obtuse to the bases of the neighboring grooves 182a, 182b. The groove 166c and the rim 184c are both substantially longer in length and width, respectively, compared to the other grooves and rims in the profiled section 162, 180.

If desired, although probably not necessary as the seal is made up outside the well bore, the grooves 166, 182 may be filled with a compliant material being a sealant, foam or gel which may be compressed when the coupling 110 is made-up as will be described hereinafter.

In use, the first end 128 of the first tubular member 112 is inserted into the second end 150 of the second tubular member 114 until the profiled sections 162, 180 are coaxially arranged on the bore 118. This is the arrangement shown in FIG. 2. A metal to metal seal is created between the profiled sections 162, 180 at the first end 128 of the first tubular member 112 and the second end 150 of the second tubular member 114. This is achieved by applying force to the outer surface 160 at the second end 150 of the second tubular member 114.

Preferably, this inward radial force is applied by a swage die as is known in the art. The swage die (not shown) is fitted around the outer surface 148 of the second tubular member 114 on the body 142. The tubulars 112, 114 are then moved relative to the swage die to cause the die to move over the outer surface 160 of the second end 150. As the inner diameter of the swage die is fixed to the diameter 126 of the body 142, the second end 150 will be elastically deformed and move radially inwards so that, initially, the second lower profiled section 180b is progressively pressed into the first lower profiled section 162b with the respective rims 168b, 184b locating in the opposing grooves 182b, 166b. This is aided by the sloping walls 172b of the first lower profiled section 162b guiding the overhangs 189b of the second lower profiled section 180b in and under the overhangs 191b of the first lower profiled section 162b. Consequently the overhangs 189b, 191b intermesh with the overhangs 189b effectively picking-up the first end 128 of the first tubular member 112 as the swage die is moved relative to the tubulars 112, 114. When the swaged die reaches the central portion 144, the process is reversed with the side wall 167a of the second upper profiled section 180a now guiding the overhangs 191a of the first upper profiled section 162a up and under the overhangs 189a of the second lower profiled section 180a. The loading is now reversed as the first tubular member 112 effectively picks up and supports the end 150 of the second tubular member 114. The intermeshed arrangements of overhangs 189, 191 are morphed together to form a metal to metal seals at all contact points between the elastically deforming ends 128, 150 of the first and second tubular members 112, 114, and the first end 128 of the first tubular member 112 is also moved radially inwards.

When the die has passed over the ends 128, 150 it can pass onto body 116 of the first member 112 as the outer diameter of body 116 is the same as that of body 142.

When the coupling system 110 is made-up, the outer surfaces 124, 140, 160, 148 are now substantially continuous with a diameter 126 matching the bodies 116, 142 of the tubular members 112, 114. Ideally, the inner surfaces 120, 136, 156, 146 are now substantially continuous with a diameter 122 matching the bodies 116, 142 of the tubular members 112, 114. As the ends 128, 150 have been brought together each rim 168, 184 to be forced into the corresponding groove 182, 166 with the overhangs 189, 191 meshing together in opposite directions on the upper and lower profiled sections 162, 180. This arrangement provides increased vertical and radial loading on the joint.

It will be readily apparent that the tubular members 112, 114 may be identical with each having a first end 128 and a second end 150. By coupling successive tubular members 112, 114 together a tubing string can be formed. If the body 116, 142 of the identical tubular members 112, 114 is selected to be a standard size used in the oil and gas exploration and production, the tubing string can then be used as a drill string, casing string or liner string. The resulting string will have a continuous inner and outer surface with a uniform bore therethrough. The use of pin and box sections is removed so that there are no protrusions from the cylindrical body of the string.

Figure 3:
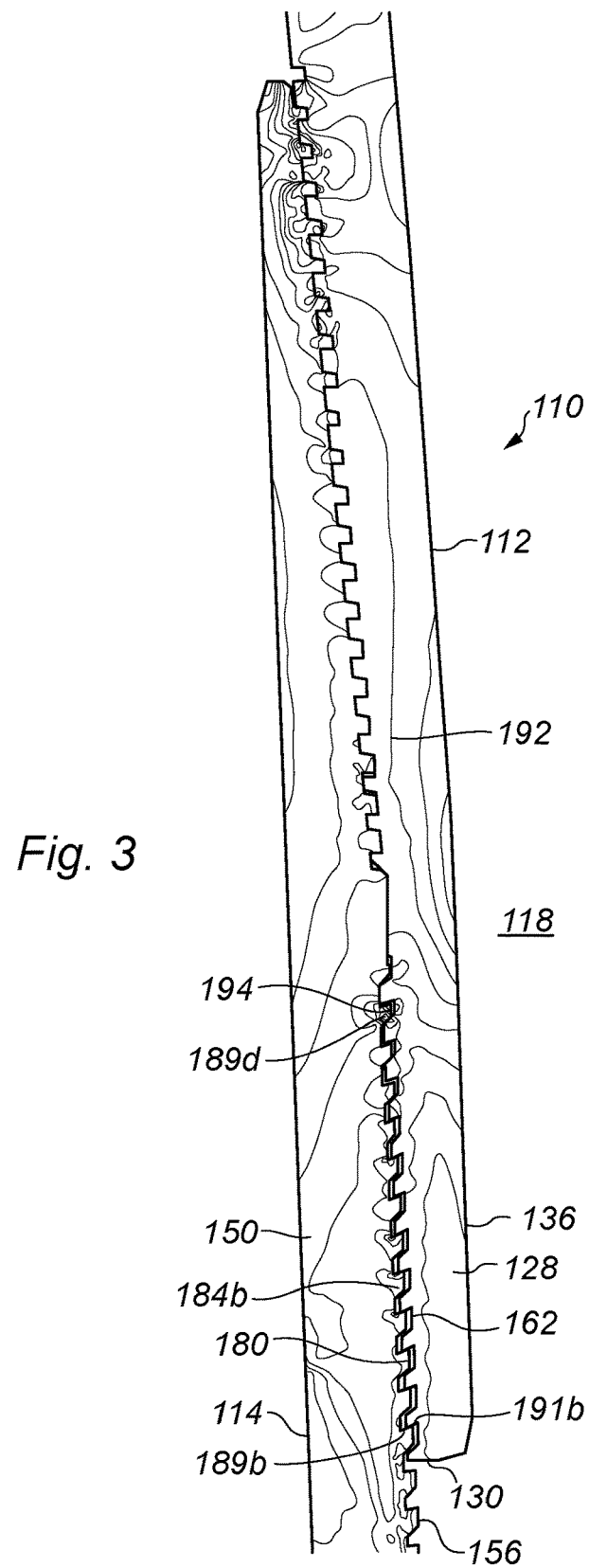
FIG. 3 is a half cross-sectional view of the coupling system of FIG. 2 when pressure is applied to test for collapse.
Figure 4:
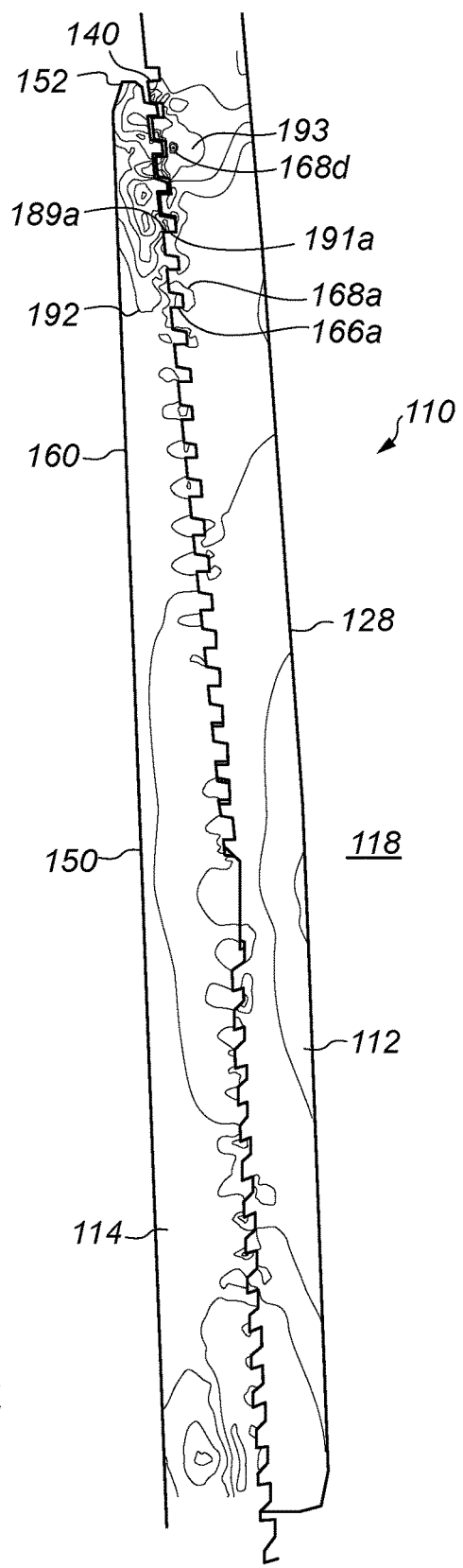
FIG. 4 is a half cross-sectional view of the coupling system of FIG. 2 when pressure is applied to test for burst.

The increased burst and collapse ratings provided by the present invention can be seen in FIGS. 3 and 4. Referring initially to FIG. 3 of the drawings there is shown the coupling system 110 following make-up and now exposed to internal pressure to test the coupling 110 under burst conditions. Contour lines 192 are illustrated to show portions of stress applied to the ends 128, 150 respectively. Under burst testing, pressure is applied through the bore 118 and is directed against the inner surfaces 136, 156 of each end 128, 150 respectively. As seen in the Figure, pressure enters the coupling at the distal end 130 of the first tubular member 112. The pressure begins to force the profiled sections 162, 180. However, each pair of overhangs 189b, 191b are actually forced into a tighter gripping relationship as the end 128 is forced away from the end 150. The pressure/stress on the coupling at each rim 184b, progressively increases up the overhangs 189b towards the central portion 144, reaching a maximum 194 on the last overhang 189d. The intermeshing 189a, 191b are effectively strengthened on burst pressure with an increased resistance being provided axially along the coupling 110. Thus the coupling 110 holds well and has a greater burst rating than standard screwthread couplings.

Referring now to FIG. 4, the coupling 110 is now shown exposed to pressure from outside. The pressure acts against the surfaces 150, 140 aiming to cause collapse of the tubular members 112, 114 at the coupling 110. The pressure now enters the coupling at the distal end 152 of the second end 150 of the second tubular member 114. As the pressure acts on surface 140 the tip of the second end 150 begins to lift but the overhangs 189a, 191a are interlocked and the pressure merely increases their relative hold and the consequent seal between the tubular members 112, 114. As shown, the maximum stress is found on the first tubular member 112 at the second rim 168d from the distal end 152. Thus the pressure has merely caused a rapid sealing of the overhangs 189a, 191a and prevented separation along the coupling very rapidly. This shows that the coupling 110 of the present invention provides an improved collapse rating over the prior art couplings.

The principle advantage of the present invention is that it provides a coupling system for connecting two tubular members which provides a joint having increased load bearing capacity.

A further advantage of the present invention is that it provides a coupling system for connecting two tubular members which provides a joint having increased both increased vertical and radial load bearing capacity.

A yet further advantage of the present invention is that is that it provides a coupling system for connecting two tubular members which provides a joint having increased burst and collapse ratings.

It will be appreciated by those skilled in the art that modifications may be made to the invention herein described without departing from the scope thereof. For example, while the tubular members have been described as metal structures, only the end portions need to have metal to form the seal and thus the tubular members may be of composite form.

We claim:

1. A non-threaded coupling system between first and second tubular members comprising:
a first tubular member having a first end which includes a first profiled section extending circumferentially and continuously around an outer surface;
a second tubular member having a second end which includes a second profiled section extending circumferentially and continuously around an inner surface;
the first end of the first tubular member being inserted within the second end of the second tubular member so that the profiled sections are coaxial and then by application of a force creating a metal to metal seal between the tubular members at the profiled sections, characterised in that:
at least one profiled section includes at least two rims each forming a projection from a surface of the tubular member with a corresponding groove therebetween, the groove having a base and the projections each providing a sloping wall which forms an angle with the base, wherein at least one of the sloping walls forms an acute angle with the base to provide a overhang to the base;
the at least one profiled section includes two overhangs, the overhangs being oppositely directed; and
wherein the overhangs are on opposite sides of a single projection.

2. A non-threaded coupling system according to claim 1 wherein there are a plurality of overhangs comprising a plurality of first overhangs on an upper portion of the first profiled section and a plurality of second overhangs on a lower portion of the first profiled section, the first and second overhangs being oppositely directed.

3. A non-threaded coupling system according to claim 2 wherein correspondingly, there is a plurality of second overhangs on an upper portion of the second profiled section and a plurality of first overhangs on a lower portion of the second profiled section.

4. A non-threaded coupling system according to claim 1 wherein there are a plurality of projections and each projection provides a guide surface opposite the overhang.

5. A non-threaded coupling system according to claim 1 wherein the first and second tubular members have the same outer diameter and inner diameter.

6. A non-threaded coupling system according to claim 1 wherein the force is applied radially outwardly.

7. A non-threaded coupling system according to claim 1 wherein the force is applied radially inwards.

8. A non-threaded coupling system according to claim 1 wherein the projection is a continuous annular rim.

9. A non-threaded coupling system according to claim 1 wherein the first profiled section and the second profiled section are tapered.

10. A method of coupling tubular members at a well, comprising the steps:
a) providing a non-threaded coupling system between first and second tubular members comprising: a first tubular member having a first end which includes a first profiled section extending circumferentially and continuously around an outer surface; a second tubular member having a second end which includes a second profiled section extending circumferentially and continuously around an inner surface; and at least one profiled section includes at least one profiled section includes at least two rims each forming a projection from a surface of the tubular member with a corresponding groove therebetween, the groove having a base and the projections each providing a sloping wall which forms an angle with the base, wherein at least one of the sloping walls forms an acute angle with the base to provide a overhang to the base; the at least one profiled section includes two overhangs, the overhangs being oppositely directed; and wherein the overhangs are on opposite sides of a single projection;
b) gripping the second tubular member in a tubular string at the well;
c) supporting the first tubular member and moving the first tubular member to the second tubular member;
d) locating the first end of the first tubular member into the second end of the second tubular member;
e) then applying a force to move the first and second ends relative to each other under elastic and plastic deformation; and
f) creating a metal to metal seal between the first end of the first tubular member and the second end of the second tubular member.

11. A non-threaded coupling system between first and second tubular members comprising:
a first tubular member having a first end which includes a first profiled section extending circumferentially and continuously around an outer surface;
a second tubular member having a second end which includes a second profiled section extending circumferentially and continuously around an inner surface;
the first end of the first tubular member being inserted within the second end of the second tubular member so that the profiled sections are coaxial and then by application of a force creating a metal to metal seal between the tubular members at the profiled sections, characterised in that:
at least one profiled section includes at least two rims each forming a projection from a surface of the tubular member with a corresponding groove therebetween, the groove having a base and the projections each providing a sloping wall which forms an angle with the base, wherein at least one of the sloping walls forms an acute angle with the base to provide a overhang to the base;
there are at least two overhangs, a first overhang on the first profiled section and a second overhang on the second profiled section, the first and second overhangs being oppositely directed and separated longitudinally; and
wherein a mating profile at each overhang is a projection having an outer face which is perpendicular to the surface of the tubular member.

12. A non-threaded coupling system according to claim 11 wherein there are a plurality of overhangs comprising a plurality of first overhangs on an upper portion of the first profiled section and a plurality of second overhangs on a lower portion of the first profiled section, the first and second overhangs being oppositely directed.

13. A non-threaded coupling system according to claim 12 wherein correspondingly, there is a plurality of second overhangs on an upper portion of the second profiled section and a plurality of first overhangs on a lower portion of the second profiled section.

14. A non-threaded coupling system according to claim 11 wherein there are a plurality of projections and each projection provides a guide surface opposite the overhang.

15. A non-threaded coupling system according to claim 11 wherein the first and second tubular members have the same outer diameter and inner diameter.

16. A non-threaded coupling system according to claim 11 wherein the force is applied radially outwardly.

17. A non-threaded coupling system according to claim 11 wherein the force is applied radially inwards.

18. A non-threaded coupling system according to claim 11 wherein the projection is a continuous annular rim.

19. A non-threaded coupling system according to claim 11 wherein the first profiled section and the second profiled section are tapered.

20. A method of coupling tubular members at a well, comprising the steps:
   a) providing a non-threaded coupling system between first and second tubular members comprising: a first tubular member having a first end which includes a first profiled section extending circumferentially and continuously around an outer surface; a second tubular member having a second end which includes a second profiled section extending circumferentially and continuously around an inner surface; and at least one profiled section includes at least one profiled section includes at least two rims each forming a projection from a surface of the tubular member with a corresponding groove therebetween, the groove having a base and the projections each providing a sloping wall which forms an angle with the base, wherein at least one of the sloping walls forms an acute angle with the base to provide a overhang to the base; there are at least two overhangs, a first overhang on the first profiled section and a second overhang on the second profiled section, the first and second overhangs being oppositely directed and separated longitudinally; and a mating profile at each overhang is a projection having an outer face which is perpendicular to the surface of the tubular member;
   b) gripping the second tubular member in a tubular string at the well;
   c) supporting the first tubular member and moving the first tubular member to the second tubular member;
   d) locating the first end of the first tubular member into the second end of the second tubular member;
   e) then applying a force to move the first and second ends relative to each other under elastic and plastic deformation; and
   f) creating a metal to metal seal between the first end of the first tubular member and the second end of the second tubular member.

* * * * *